(12) United States Patent
Hinds

(10) Patent No.: US 6,960,056 B2
(45) Date of Patent: Nov. 1, 2005

(54) GEOMETRY FOR A SUGAR CANE LOADER BOOM INCLUDING A TOP-SUPPORTED SWIVEL MAST

(75) Inventor: Michael Lynn Hinds, Thibodaux, LA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/688,552

(22) Filed: Oct. 17, 2003

(65) Prior Publication Data

US 2005/0095108 A1 May 5, 2005

(51) Int. Cl.[7] .................................................. B66B 1/00
(52) U.S. Cl. ...................... 414/680; 212/300; 414/685; 414/722
(58) Field of Search ............................... 414/680, 685, 414/686, 722, 729; 212/300, 232

(56) References Cited

U.S. PATENT DOCUMENTS

| | | | |
|---|---|---|---|
| 2,874,854 A | | 2/1959 | Thornton |
| 3,235,097 A | * | 2/1966 | Ohman ........................ 212/300 |
| 3,263,822 A | * | 8/1966 | Weinman ................. 414/680 X |
| 4,609,318 A | | 9/1986 | Rodrigue et al. ........... 414/132 |
| 4,614,476 A | | 9/1986 | Mello Ribeiro Pinto .... 414/729 |
| 5,285,856 A | | 2/1994 | Lewinski et al. ........... 172/816 |
| 5,810,548 A | * | 9/1998 | Stenudd ....................... 414/680 |
| 6,866,288 B2 | * | 3/2005 | Martin .................... 414/680 X |

OTHER PUBLICATIONS

Cameco, SP 1800 Four–Wheel–Drive Self Propelled Cane Loader, Mar. 1998, pp. 1–4.
Cameco, SP–2254 Cane Loader, Sep. 1997, pp. 1–2.
Cameco, SP–3000 Four–Wheel–Drive Self Propelled Cane Loader, Aug. 1995, pp. 1–4.
Cameco, SP–2400 Cane Loader, Jul. 1994, pp. 1–2.

* cited by examiner

*Primary Examiner*—Donald W. Underwood

(57) ABSTRACT

A loader boom of a sugar cane loader includes a swivel mast having a vertical axis located to intersect the mid-point of a furrow located between first and second cane rows that would respectively pass centrally beneath the loader vehicle and outside wheels at one side of the loader vehicle during loading operation. The loader boom includes an inner boom section having a middle portion that extends parallel to the swivel mast axis to a height approximating that of a transporter container to be loaded when the boom is in a fully raised position, and having a lower end portion that is joined to the bottom of, and extends perpendicular to, the middle portion and is pivotally attached to an opposite side of the swivel mast axis from the middle portion. Mounted to the loader is a push piler implement having tines located for operating in a central region of the furrow free of the cane rows.

10 Claims, 3 Drawing Sheets

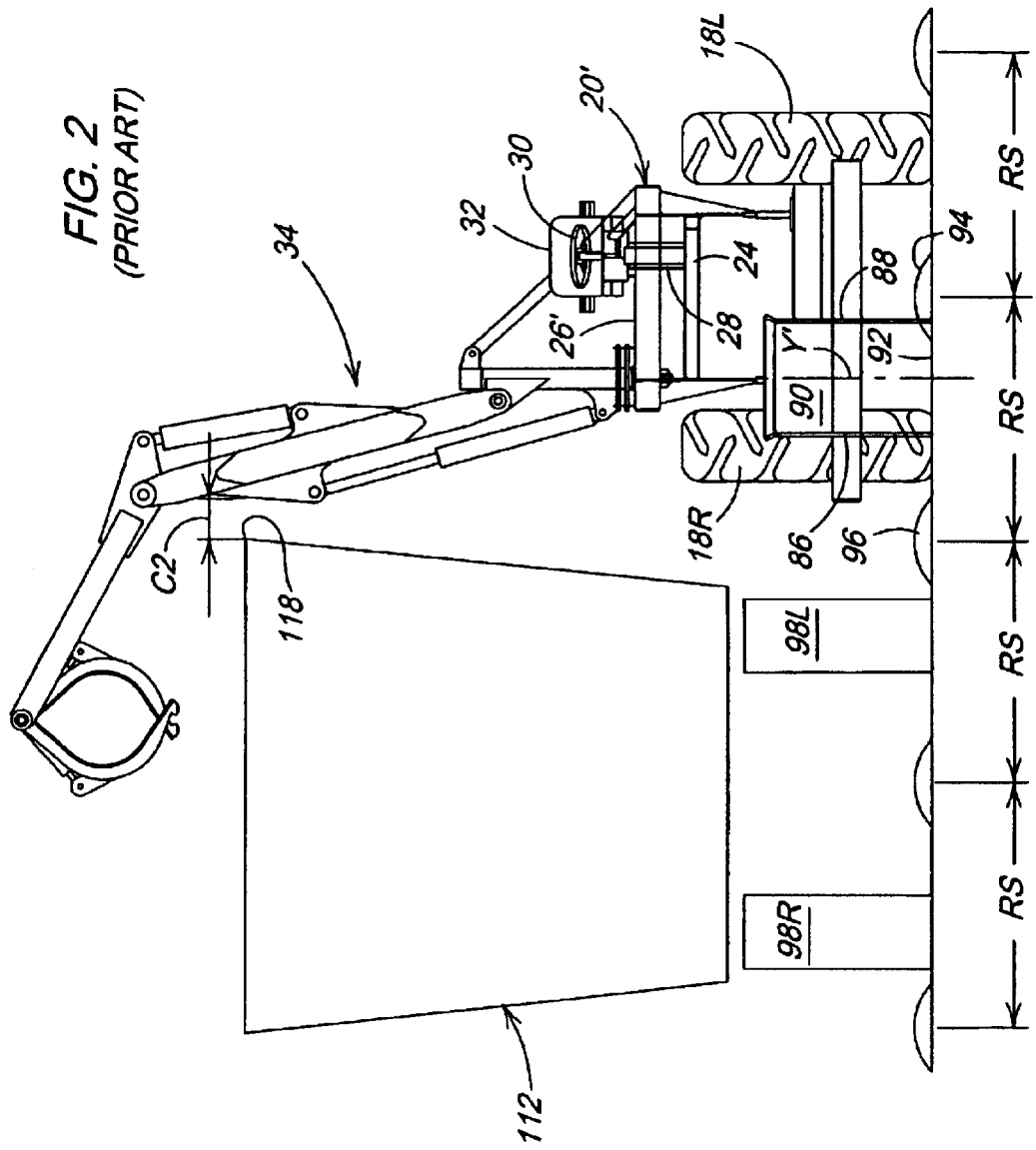

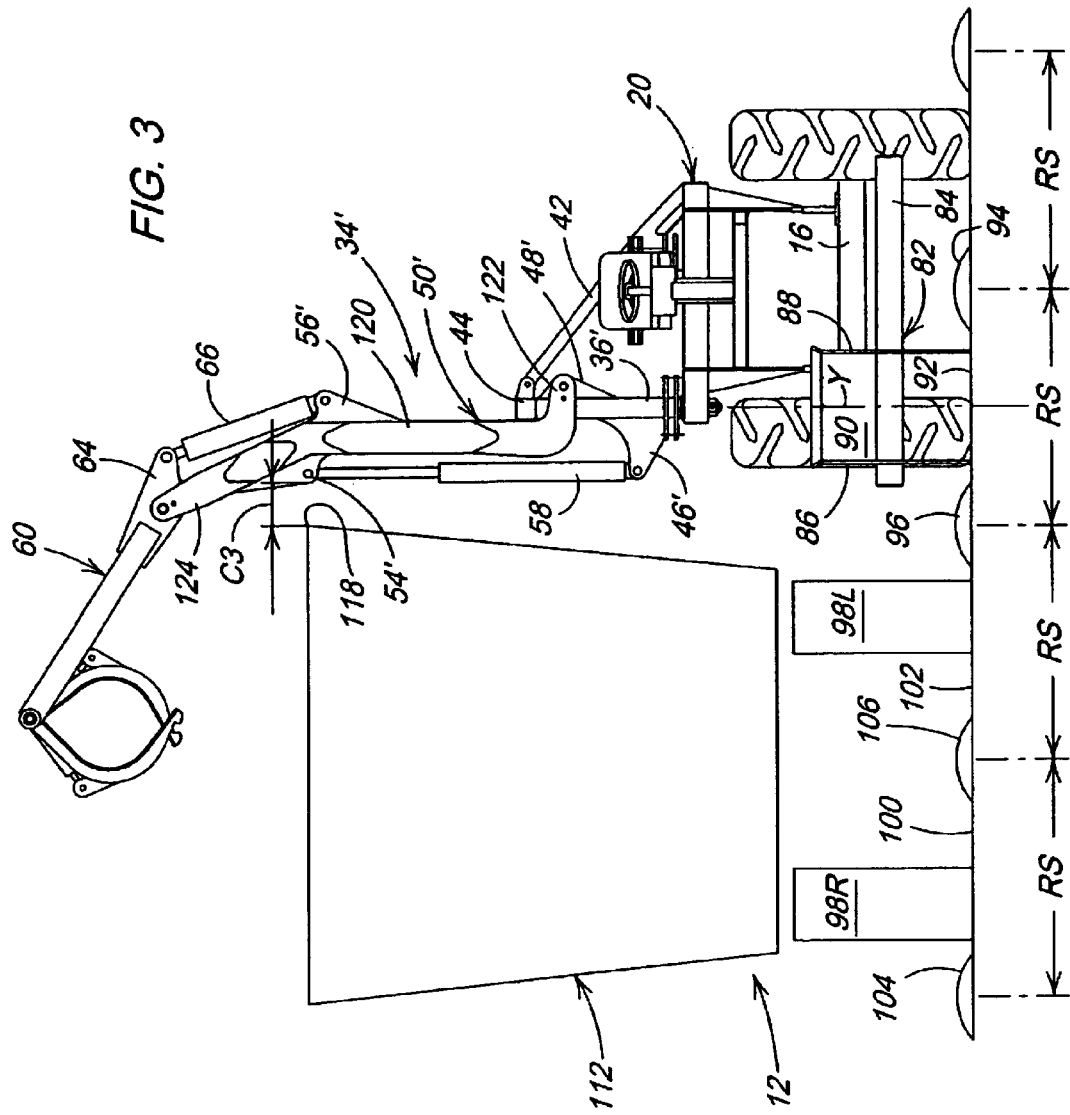

US 6,960,056 B2

GEOMETRY FOR A SUGAR CANE LOADER BOOM INCLUDING A TOP-SUPPORTED SWIVEL MAST

FIELD OF THE INVENTION

The present invention relates to sugar cane loaders, and more particularly relates to such loaders that include a side-mounted boom including a top-supported swivel mast.

BACKGROUND OF THE INVENTION

The height and width of containers used with self-propelled or towed transport equipment for hauling harvested whole stalk sugarcane from the field has increased over the years in an effort to minimize transportation costs due to increased fuel costs. The additional height, in turn, requires the sugar cane whole stalk loader to lift the cane higher in the air in order to clear the top of the transport container. The additional width of the transport container has caused problems with physical contact between the loader and the transport container, thereby necessitating that the loader and container operate further apart. As sugarcane is planted in raised beds or rows, it is necessary for the transport unit to move one additional row away from the loader even though the additional width of the transport container may only be one foot. In some areas of the world, this could be up to six feet. This, of course, necessitates a longer reach for the loader and leads to instability as the load has to be moved further from the center of gravity of the loader. Some manufacturers have solved the problem by building larger loaders that straddle two rows of cane for stability and have loading booms capable of both high and long reach. Further, the swivel mast of such larger loaders are normally supported only at their base and this requires a robust bearing structure. These solutions all result in higher manufacturing costs.

Side-mounted sugar cane loaders, whether tractor-mounted or dedicated loaders built only for that purpose, use the same swivel mast boom mechanism. A vertical pin is supported on the bottom side at a fixed mounting point on the machine. A pair of removable diagonal braces for supporting the swivel mast pin are arranged perpendicular to each other and have upper ends coupled to the top of the pin and lower ends attached to the machine. One of the diagonal braces is basically parallel to the direction of travel of the machine while the other diagonal brace is transverse or normal to the direction of travel. The brace parallel to the direction of travel carries the top pin load when the loader boom is lifting from the front of the machine. The transverse brace carries the top pin load when the swivel mast, which is in the form of a hollow tube received on the pin, is rotated about the pin so as to support the loader boom for working at the side. At positions in between those for front and side operation, the two diagonal braces share the load. The swivel mast has mounting points at its lower end for being coupled to one or two hydraulic cylinders that provide the force for rotating the mast. The swivel mast is also provided with a mounting point for pivotally attaching an inner end of a main or inner boom section, and another mounting point for one end of a hydraulic boom cylinder that has its other end coupled to the main boom section. Another hydraulic cylinder is coupled between the main boom section and an outer or sub-boom section, the latter having an articulated grab mechanism coupled to its outer end. The function of the grab mechanism is to encircle a bundle of cane stalks, and then close about the bundle in a constricting manner for preventing the cane stalks from falling back to the ground. Once the grab closes on the bundle of cane stalks, the two boom cylinders are activated such that the grab is lifted into the highest position. The swivel mast is then pivoted 90° to the direction of travel so as to position the loaded grab over the container of the transport unit traveling alongside the loader. The grab is then opened and the stalks of cane are deposited in the container. It is during the side rotate process that adequate clearance between the loader and transport must be provided.

Known cane loaders of the swivel mast design often have both the mounting point for the boom and for the hydraulic boom lift cylinder located at the front side of the mast that comes closest to the transport unit. U.S. Pat. No. 2,874,854 discloses a slightly different arrangement wherein the mounting points for the boom and the boom cylinder are located on the axis of the swivel mast. In one embodiment (see FIG. 1), no diagonal brace is provided for the swivel mast, while in a second embodiment (see FIGS. 5 and 6), a pair of diagonal braces 75 are provided. Without the top being supported, it would take a very large diameter pin and a robust bearing arrangement at the base of the pin, to carry the bending moment induced by the load of cane and the lift cylinder. Such an arrangement is similar to that of large cane loaders that have the boom and lift cylinder coupled to the top of a mast cantilevered off a large Rotek® type bearing.

In a typical cane loader, the tire centers are slightly outboard of the centers of the furrows between adjacent cane rows, and the swivel mast center is located just inboard of the tire centerline so as to be on the centerline of the furrow. The loaders are usually equipped with a push piler for gathering harvested cane that has been deposited in the furrow; and this piler includes cane-engaging tines that are spaced apart so as to define a pocket centered relative to the furrow centerline. This makes it possible then for the loader to be equipped with a non-rotating grab, since with the loader boom rotated to the front, the grab will be properly oriented for closing crosswise to the cane, which is oriented crosswise to the centerline of the furrow. For a more complete explanation of the theory of operation, see U.S. Pat. Nos. 4,614,476; 4,609,318; and 5,285,856.

In recent years, as the height and width of containers of sugarcane transporters have increased, some manufacturers have moved the center of the swivel towards the center of the tractor to gain clearance between the swivel mast boom components and the transport unit. With loaders equipped with a non-rotating grab, the cane-engaging tines, and hence, the pocket of the push piler are also moved closer to the row passing centrally beneath the tractor so that the bunched cane stalks will be better located for engagement by the grab of the loader. This results in the inside tine of the piler engaging the ground in the root zone of the cane stubble located in the row. Since sugarcane re-grows from the root system, any damage to the root system negatively impacts the yield the following year.

An additional drawback that has been observed relative to known loader boom arrangements associated with cane stalk loaders is that the relationship between the line of action of the boom lift cylinder or actuator and the point of pivotal connection of the inner boom section with the swivel mast is such that the lever arm between the line of action and the point of pivotal connection sharply decreases as the boom is lifted, which results in the speed at which the boom section is lifted increasing sharply during the lifting operation. This increasing speed is undesirable since there is considerable moment of inertia due to the loaded cane grab and the moving boom components that must be arrested prior to the lift actuator reaching the end of its stroke in order to avoid an unwanted shock load on the boom arrangement.

What is needed is an inexpensive way to gain clearance between the loader boom and the container of the transporter unit without negatively impacting the relationship of the piler pocket and the furrow center, and at the same time, to present a loader boom structure which is simpler to control in order to avoid shock loads during the raising and positioning of a loaded grab for depositing the cane in a container of a cane transport.

SUMMARY OF THE INVENTION

According to the present invention, there is provided an improved whole stalk cane loader equipped with a side-mounted loader boom having a swivel mast.

An object of the invention is to provide a loader of the afore-mentioned type which has a relatively simple boom geometry that permits cane to be lifted into a modern, tall and wide transport container without there being interference between the boom structure and the transport container, and with the lifting being done without there being an acceleration in the speed of the raising boom structure.

The aforementioned objects are achieved with a specially shaped, inner boom section that extends between the swivel mast and grapple support arm, with a central, major part of the inner boom section extending parallel to the vertical swivel mast axis when the inner boom section is in its fully raised position. When the inner boom section is in its fully raised position, an upper end portion of the inner boom section is angled away from the swivel mast axis, and a lower end portion of the inner boom section is disposed at a right angle to, and extends across, the swivel mast axis. The geometry of the inner boom section and the swivel mast is such that the lever arm, between the pivot point of the main boom section with the swivel mast and the line of action of the boom lift cylinder, remains substantially constant throughout lifting operation, or in fact, decreases as the cylinder reaches the end of its stroke so that the boom is lifted at a substantially constant rate of speed for easier control and gives the desired effect of slowing the mass of the structure and load of cane at the end of the lifting operation.

These and other objects of the invention will become apparent from a reading of the ensuing description together with the appended drawings.

BRIEF DESCRIPTION OF THE DRAWINGS

FIG. 2 is a view like that of FIG. 1, but showing a prior art solution to the interference problem depicted in FIG. 1.

FIG. 3 is a view like that of FIG. 1, but showing a loader constructed in accordance with the present invention.

DESCRIPTION OF THE PREFERRED EMBODIMENT

Figure 1:
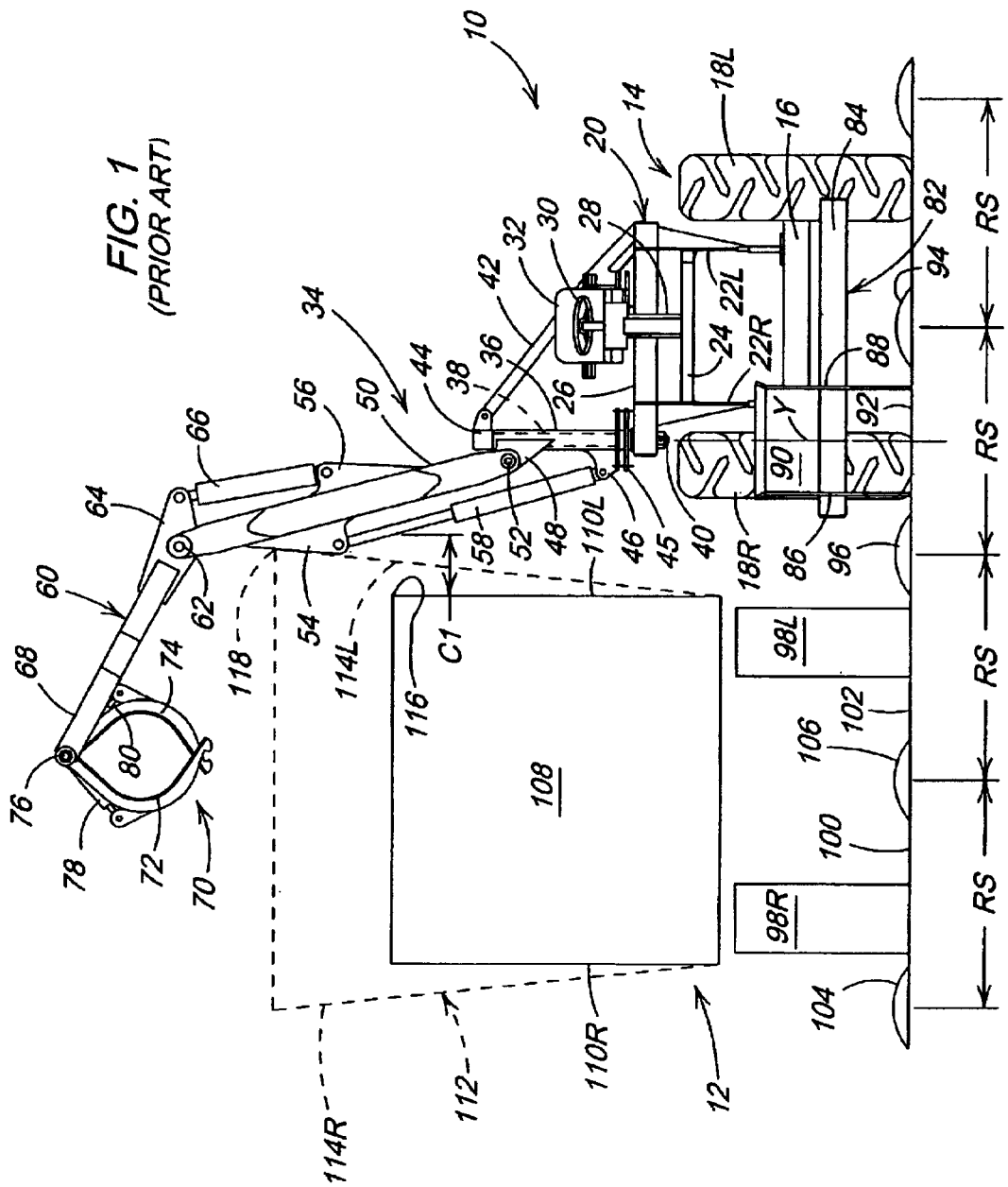
FIG. 1 is a somewhat schematic front view of a prior art sugar cane loader equipped with a push piler implement and located in a sugarcane field beside a sugarcane transporter, with the loader boom being shown in a fully raised position disposing a grab above a container of the transporter, the container being shown in solid lines, representing the size used with older transporters and shown in dashed lines representing the size used with newer transporters and showing the interference problem that results from the larger size.

Preliminarily, it is to be noted that certain terms such as "front", "rear", "right", and "left" are considered standing behind the vehicle or implement being described and facing in the forward direction of travel.

Referring now to FIG. 1, there is shown a prior art sugarcane loader 10 located in a loading position beside a cane transporter 12.

The loader 10, as shown here, utilizes a wheel tractor 14 as a traction unit, which is operated in reverse when used for the traction unit for a loader. The tractor 14 has a main frame (not shown) which is joined to a front axle 16 having opposite right- and left-hand ends to which a pair of driven, front ground wheels 18R and 18L are respectively mounted. A pair of rear, steerable wheels (not shown) are mounted to opposite ends of a front axle coupled to the main frame for oscillating about a fore-and-aft axis, in a manner well known in the art. Of course, the traction unit could be any of various other well-known tractor constructions, including ones having front and rear hydrostatically driven pairs of wheels, for example.

A platform structure 20 is supported by the main frame of the tractor 14 and for this purpose includes right- and left-hand, transversely spaced upright side members 22R and 22L fixed to the axle 16. The platform structure 20 includes a horizontal operator's platform 24 and a cross beam 26 extending between the members 22R and 22L, with the beam 26 being spaced above a rear portion of the platform 24. Secured to a central, forward location of the operator's platform 24 is an upstanding pedestal 28 which supports a steering shaft having a steering wheel 30 coupled to its upper end. A seat 32 is located on a pedestal, not visible, located directly behind the pedestal 28 from which a seated operator can reach the steering wheel 30, as well as other controls (not shown), for the loader 10.

A loader boom arrangement 34 includes a vertical, cylindrical swivel mast 36 received on cylindrical post 38 mounted to a right-hand location of the beam 26 so as to be aligned along a vertical axis Y, which is located inward of the centerline (not shown) of the right wheel 18R. The cylindrical post 38 has a lower threaded end on which is received a nut 40 for securing the post 38 in place. A first diagonal brace 42 extends between a left-hand location of the beam 26 and a leftwardly projecting ear of a cylindrical attaching member 44 received on an upper end of the post 38. A second diagonal brace (not shown) extends perpendicular to the diagonal brace 42 and has an upper end coupled to an ear projecting rearwardly from the attaching member 44, and has a lower end coupled to a location on the frame of the tractor 14. One or more extensible and retractable hydraulic actuators (not shown) are coupled directly, or indirectly through linkages, between a bracket 45, located at a bottom location of the swivel mast 36, and the beam 26. The swivel mast 36 is provided with upper and lower mounting ears 46 and 48, respectively, located on the same side of the swivel axis Y. One end of a straight, elongate inner or main boom section 50 is pivotally attached to the upper mounting ear 46 by a pivot pin 52. A mounting ear 54 is provided on an under side of the boom section 50 at a location just beyond a mid-length location from the pin 52, and a mounting ear 56 is mounted on an opposite side of the boom section 50 from the ear 54 at an approximate mid-length location of the boom section 50. Mounted between the lower ear 46 on the swivel mast 36 and the ear 54 on the boom section 50 is an extensible and retractable, hydraulic boom lift actuator or cylinder 58. An outer boom section 60 is pivotally mounted to an outer end of the inner boom section 46 by a pivot pin 62 and includes an end that extends a short distance from pivot pin 56 and defines a mounting ear 64. An extensible and retractable, grab-position control hydraulic actuator 66 is coupled between the ears 56 and 64. The outer boom section has a forked outer end portion 68 disposed at opposite ends of a grab arrangement 70 comprising a pair of opposed arcuate arms 72 and 74 pivotally mounted, as by pin 76, to an outer end of the forked outer boom portion 60. A pair of extensible and retractable, grapple arm control hydraulic actuators 78 and 80, respectively, have one of their ends coupled to the arms 72 and 74, and the other of their ends mounted to respective ears located in the vicinity of the pin 76.

A push piler implement 82 is mounted, in a manner not shown, to a forward end of the frame of the tractor 14 and includes a horizontal transverse beam 84 located in front of, and offset to the right relative to a center point between the wheels 18R and 18L, such that a right-hand end of the beam 84 projects slightly outward beyond an outer face of the wheel 18R; and the left-hand end of the beam 84 is located just to the right of a center plane of the wheel 18L. The push piler implement 82 further includes a pair of transversely spaced tines 86 and 88 fixed to, and projecting forward from, the beam 84. The tines 86 and 88 are in the form of flat plates each having an upper end portion, which is rectangular is side view and extends above the level of the beam 84. Extending between, and joined to back edges of these upper end portions of the tines 86 and 88, is a vertical plate 90 having its lower edge fixed along the beam 84. Each of the tines 86 and 88 has a lower front edge portion which is curved downwardly and forwardly so as to present a surface for lifting and pushing cane stalks lying crosswise of a furrow 92 extending between a center cane row 94, located centrally between the front wheels 18R and 18L and an adjacent right-hand row 96, which is located outboard of the front wheel 18R. The tines 86 and 88 cooperate to define a pocket between them which is centered within the furrow 92 and with respect to the vertical pivot axis Y of the swivel mast 36.

The cane transporter 12 includes a chassis (not shown) supported on front and rear pairs of wheels, of which only the front pair of wheels 98R and 98L is shown. The wheels 98R and 98L are respectively located outwardly of center points of respective furrows 100 and 102. The furrow 100 extends between a row 104 spaced a short distance to the right from the wheel 98R and a row 106 located centrally between the wheels 98R and 98L. The furrow 102 extends between the row 106 and the row 96, with it being noted that the wheel 98L is spaced a short distance to the right from the row 96. Mounted to the chassis of the transporter 12 is an open top container 104 having opposite, vertical sides 110R and 110L, which are respectively located in vertical planes that intersect the furrows 100 and 102 at respective locations between the row 104 and the wheel 98R and between the row 96 and the wheel 98L.

An outline of a container 112 of a new transporter is shown and includes right- and left-hand sides 114R and 114L that diverge upwardly to respective locations vertically above the rows 104 and 106.

In one practical example of the prior art loader 10 and transporter 12, the row spacing RS of the cane rows is equal to 1.5 meters, the container 108 is approximately 2.44 meters wide and 2.14 meters high, and the top of the container 108 is approximately 3.34 meters above the ground. An ample clearance C1 of about 0.43 meters exists between the boom actuator 58 and an upper left hand corner 116 of the container 108 when the boom arrangement 34 is in a fully raised position, as shown in FIG. 1. However, no clearance exists between the mounting ear 54 on the inner boom section 50 and an upper left-hand corner 118 of the modern-sized container 112.

Referring now to FIG. 2, there is disclosed a prior art loader 10' which differs from that disclosed in FIG. 1 only by providing a slightly different platform 20' that provides a different mounting point for the boom assembly 34, operator seat 32, and steering pedestal 28, and provides a different push piler implement 82' wherein the tines 86 and 88 are mounted on the beam 84 at a location closer to the center of the cane row 94.

Specifically, it can be seen that the platform structure 20' includes a cross beam 26' that has a width that is approximately equal to the distance between inner faces of the wheels 18R and 18L, with it being noted that in FIG. 1, the right-hand side of the cross beam 26 is approximately at the center plane of the wheel 18R. The pedestal 28 is mounted to the platform 24 at a location spaced to the left of the center point between the wheels 18R and 18L. Consequently, the steering wheel 30 is likewise spaced to the left and the seat 32 is mounted to a pedestal (not shown), mounted to the platform 24 at a location directly behind the pedestal 28.

The relocation to the left of the pedestal 28, steering wheel 30, seat support pedestal, and seat 32 is done for the purpose of providing space for allowing the swivel mast 36 of the boom structure 34 to be mounted closer to the center of the row 94 than it is in the prior art structure shown in FIG. 1. This is done for the purpose of providing additional clearance between the boom structure 34 and the modern-sized container 112 of the transporter 12. Thus, it can be seen that the swivel mast 36 is mounted along a vertical axis Y' located to the left of the center point between the cane rows 94 and 96. It can be seen that a clearance C2 results between the upper left-hand corner of the modern-sized container 112 and the boom structure 34. Using the dimensions of the practical example discussed above with reference to FIG. 1, the distance C2 is approximately 0.25 meters.

Because the grab assembly 70 is not mounted on a swivel for being oriented to different positions about an upright axis, the push piler implement 82' is modified from the implement 82 shown in FIG. 1 by having the tines 86 and 88 mounted further inward on the beam 84 by a distance equal to the distance between the axes of rotation Y and Y' of the swivel mast 36. The push piler implement 82' will then bunch cane stalks so that they can be easily picked up by the grab assembly 70. However, now the inside tine 88 operates in the root zone of cane plants located in the row 94 and may cause damage to the roots and consequently cause a decrease in crop production in following years.

It will be appreciated, that in each of the prior art loaders, the moment arm between the line of action of the boom lift actuator 58 and the pivot pin 52 connecting the inner boom section 50 to the swivel mast 36 is much greater when the lift actuator 58 is fully retracted, with the boom section 50 in a fully lowered position (not shown), than it is when the actuator 58 is fully extended, with the boom section 50 in a fully raised position, as shown. In one practical example of a loader built according to the prior art, the lever arm at the beginning of the lifting operation is 59.2 cm and is 23.3 cm when the load is lifted to full height. Thus, the lever arm decreases by more than half, and unless the operator intervenes, the speed at which the load is lifted will dramatically increase to a maximum just as the actuator 58 becomes fully extended. The shock loads that can result from the moment of inertia of the load of cane and boom structure when it comes to a sudden stop can be quite damaging to the loader, and it is difficult for the operator to control the speed so that this does not happen.

Referring now to FIG. 3, therein is depicted the present invention, with the structure shown in FIG. 3 differing from that shown in FIG. 1, only in regard to a boom assembly 34' and then only with respect to the a swivel mast 36' and an inner boom section 50', with all other structure being denoted by the same reference numerals used in FIG. 1.

Specifically, it can be seen that the swivel mast 36' includes lower and upper mounting ears 46' and 48', with the lower ear 46' extending a considerable distance to the right of the axis Y, and with the upper ear 48' being located on an opposite side of the axis Y from the lower ear 46'. The inner boom section 50' includes a straight middle portion 120, which when the boom assembly 34' is in its fully raised position, as shown, extends vertically in parallel relationship to the axis Y and is joined to lower and upper end portions 122 and 124, respectively. The lower end portion 122 is joined at a right angle to the lower end of the straight middle portion 120 and forms a bifurcated mounting ear having opposite parts disposed in straddling relationship to the mast 36' and being coupled to the mounting ear 48' by the pin 52. Thus, the pin 52 is on the opposite side of the axis Y from the longitudinal center of the straight middle portion 120. The upper end portion 124 is angled outwardly from the middle portion 120 of the inner boom section 50' and forms an included angle of 155° with the middle portion 120. When the boom arrangement 34' is in its fully raised position shown, the junction between the upper end portion 124 and the middle portion 120 is at a height which is approximately that of the modern-sized container 112. A mounting ear 54' is located at the junction between the middle and upper end portions 120 and 124, respectively, of the inner boom section 50', and the hydraulic actuator 58 is coupled between the mounting ear 46' of the swivel mast 36' and the mounting ear 54'. The outer boom section 60 is pivotally mounted to the outer end of the inner boom section 50' by the pin 62. The hydraulic actuator 66 is coupled between a mounting bracket 56' at the top, inner side of the middle portion 120 of the inner bracket section 50' and the mounting ear 64 of the outer boom section 60.

With this arrangement, a clearance C3 exists between the upper left-hand corner 118 of the modern-sized container 112 and the mounting bracket 54', this distance being approximately 0.26 meter when the dimensions of the container 112 and row spacing are those of the practical example discussed above with reference to FIG. 1.

Thus, it will be appreciated that the geometry of the inner boom section 50' and the swivel mast 36' results in a boom assembly that is operable for picking up harvested whole cane stalks that have been pushed into a pile by the tines 86 and 88 of the push piler implement 82 after the tines have been advanced centrally between cane rows 94 and 96. Because the push piler tines 86 and 88 are disposed centrally in the furrow 92 between the cane rows 94 and 96, they do not disturb the root zone of the cane plants located in these rows and thus do not damage the cane roots.

Because the swivel axis Y of the swivel mast 36' is located directly above the center point between the cane rows 94 and 96, the arms 72 and 74 of the grab assembly 70 can be properly oriented for picking up the cane stalks by rotating the swivel mast 36' through an angle of 90° from its position shown in FIG. 2, opening the arms 72 and 74 by extending the actuators 78 and 80, and lowering the grab assembly 70 by retracting the actuator 58.

It is to be noted that the pivot connection of the inner boom section 50', with the swivel mast 36', is such that the lever arm between the line of action of the actuator 58 and the pivot connection, as the boom section 50' is moved between its fully lowered and fully raised position, does not vary appreciably so that the speed at which the boom section 50' is lifted does not vary appreciably. In one practical example of the boom structure 34', the lever arm when the boom section 50' is at its lowered position is 53.3 cm and the lever arm is 64.8 cm, a slight increase, when the boom section 50' is at its fully raised position. Therefore, as the load is lifted, the speed slows down due to the increasing lever arm, which is desirable in order to slow the mass of the loaded cane and boom structure as the actuator 58 approaches the end of its stroke.

Having described the preferred embodiment, it will become apparent that various modifications can be made without departing from the scope of the invention as defined in the accompanying claims.

What is claimed is:

1. In a whole stalk sugar cane loader including a tractor unit supported on ground wheels spaced apart for operating in adjacent furrows on opposite sides of a first cane row located centrally between the wheels, a platform structure mounted on the tractor, a loader boom structure including a swivel mast mounted to the platform structure for swiveling about a support post having a vertical axis located for intersecting a center point of a furrow extending between said first row and a second row located outside said ground wheels, a brace structure coupled to an upper end of said support post, said boom structure further including an inner boom section having a first end pivotally attached to said swivel mast and having a second end attached to a first end of an outer boom section, a grab assembly coupled to a second end of said outer boom section, a first extensible and retractable hydraulic actuator coupled between said swivel mast and said inner boom section for pivoting the inner boom section between lowered and raised positions, a second extensible and retractable hydraulic actuator coupled between said inner boom section and said outer boom section, and a push piler implement mounted to a forward end of said tractor unit and including a pair of transversely spaced tines defining a pocket between them for operating centrally within said furrow, the improvement comprising: said inner boom section, as considered in its raised position, includes a middle portion which extends at least substantially parallel to said axis, and includes a lower end portion joined to said middle portion so as to form an approximate right angle with said middle portion; and said inner boom section being pivotally mounted to said swivel mast at a location on an opposite side of said vertical axis from said second end when said inner boom section is in said raised position.

2. The sugar cane loader, as defined in claim 1, wherein said lower end portion is bifurcated and includes parts straddling said swivel mast.

3. In a whole stalk sugar cane loader including tractor unit supported on ground wheels spaced apart for operating in adjacent furrows on opposite sides of a first cane row located centrally between the wheels, a platform structure mounted on the tractor, a loader boom structure including a swivel mast mounted to the platform structure for swiveling about a post supported at a location above said swivel mast and having a vertical axis located for intersecting a center point of a furrow extending between said first row and a second row located outside said ground wheels, said boom structure further including an inner boom section having a first end pivotally attached to said swivel mast and having a second end attached to a first end of an outer boom section, a grab assembly coupled to a second end of said outer boom section, a first extensible and retractable hydraulic actuator coupled between said swivel mast and said inner boom section for pivoting the inner boom section between lowered and raised positions, and a second extensible and retractable hydraulic actuator coupled between said inner boom section and said outer boom section, the improvement comprising: said inner boom section including a straight portion embodied in said inner boom section between said first end and second end, and extending in approximate parallel relationship to said axis when said inner boom section is in a fully raised position, and said first extensible and retractable hydraulic actuator being coupled to said inner boom section at a location approximately at an upper end of said straight portion; and said inner boom section including a lower portion joined at an angle to a lower end of said straight portion and being pivotally coupled to said swivel mast at a location on a opposite side of said axis from said straight portion.

4. The sugar cane loader, as defined in claim 3, wherein said first hydraulic actuator is fully extended and oriented in approximate parallel relationship to said straight portion when said inner boom section is in said fully raised condition.

5. A loader boom structure adapted for being used with a sugar cane loader, comprising: a swivel mast support including a post supported only at its top and bottom and extending along a vertical axis; a swivel mast being mounted for pivoting about said post; an inner boom section having a first end mounted to said swivel mast at a location on an opposite side of said axis from a second end of said inner boom for pivoting vertically between fully lowered and fully raised positions; said inner boom section including a straight portion which extends in approximate parallel relationship to said axis when said inner boom is in said raised position; said straight portion of said inner boom section being a middle portion, which when said inner boom section is considered in said raised position, extends between lower and upper end portions which are angled in opposite directions from said middle portion; and an extensible and retractable hydraulic actuator being coupled between said swivel mast and said inner boom section for selectively pivoting said inner boom section between said fully lowered and raised positions.

6. The loader, as defined in claim 5, wherein said lower end portion is disposed at a right angle to said straight portion.

7. The loader, as defined in claim 5, wherein said upper end portion is disposed at an angle of at least approximately 25° from said straight portion.

8. The loader, as defined in claim 5, wherein said hydraulic actuator is substantially fully extended and is disposed substantially parallel to said straight portion when said inner boom section is in said fully raised position.

9. A loader boom structure adapted for being used with a sugar cane loader, comprising: a swivel mast support including a vertical post supported at upper and lower ends; a swivel mast mounted to said vertical post below said upper end for pivoting about a vertical axis; an inner boom section having a first end mounted to said swivel mast at a first location on an opposite side of said axis from a second end of said inner boom section for pivoting vertically between fully lowered and raised positions; said inner boom section including a straight portion constituting a major portion of a length dimension of said inner boom and being substantially horizontal when said inner boom section is in said fully lowered position, and being substantially vertical when said inner boom section is in said fully raised position; said straight portion of said inner boom section being a middle portion, which when said inner boom section is considered in said raised position, extends between lower and upper end portions which are angled in opposite directions from said middle portion; an extensible and retractable, hydraulic boom lift actuator being coupled between a second location of said swivel mast and said inner boom section for selectively pivoting said inner boom section between said fully lowered and raised positions; and said first location being so located relative to said boom lift actuator that a first moment arm between a first line of action of said boom lift actuator and said first location when said inner boom section is in said fully lowered position is no greater than a second moment arm between a second line of action of said boom lift actuator and said first location when said inner boom section is in said fully raised position.

10. A loader boom structure adapted for being used with a sugar cane loader, comprising: a swivel mast support including a vertical post supported at upper and lower ends; a swivel mast mounted to said vertical post below said upper end for pivoting about a vertical axis; an inner boom section having a first end mounted to said swivel mast at a first location on an opposite side of said axis from a second end of said inner boom section for pivoting vertically between fully lowered and raised positions; said inner boom section including a straight portion constituting a major portion of a length dimension of said inner boom section and being disposed substantially horizontal when said inner boom section is in said fully lowered position, and being disposed substantially vertical when said inner boom section is in said fully raised position; said straight portion of said inner boom section being a middle portion, which when said inner boom section is considered in said raised position, extends between lower and upper end portions which are angled in opposite directions from said middle portion; an extensible and retractable hydraulic boom lift actuator being coupled between a second location of said swivel mast and said inner boom section for selectively pivoting said inner boom section between said fully lowered and raised positions; and said first location being so located relative to said boom lift actuator, that as said boom lift cylinder is actuated between retracted and extended positions in moving said inner boom section between said lowered and raised positions, said boom lift actuator has respective lines of action which are spaced substantially equally from said first location so that said boom lift actuator operates through a substantially constant moment arm in moving said inner boom section between said fully lowered and raised positions.

* * * * *